United States Patent
Mikutsu (10) Patent No.: US 11,194,236 B2
(45) Date of Patent: Dec. 7, 2021

(54) OPTICAL-ELEMENT ANGLE ADJUSTMENT DEVICE AND IMAGE PROJECTION DEVICE

(71) Applicant: Ricoh Company, Ltd., Tokyo (JP)

(72) Inventor: Yasunari Mikutsu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/951,536

(22) Filed: Nov. 18, 2020

(65) Prior Publication Data

US 2021/0157219 A1   May 27, 2021

(30) Foreign Application Priority Data

Nov. 22, 2019   (JP) .............................. JP2019-211815
Jul. 30, 2020    (JP) .............................. JP2020-129245

(51) Int. Cl.
*G03B 21/14*   (2006.01)
*G02B 7/182*   (2021.01)
(Continued)

(52) U.S. Cl.
CPC .......... *G03B 21/147* (2013.01); *G02B 7/182* (2013.01); *G02B 26/008* (2013.01);
(Continued)

(58) Field of Classification Search
CPC .. G03B 21/14; G03B 21/142; G03B 21/2066; G03B 21/119; G03B 21/28; G02B 26/008; G02B 7/182
(Continued)

(56) References Cited

U.S. PATENT DOCUMENTS

| 8,210,692 B2 * | 7/2012 | Yoshimura ........... H04N 9/3155 |
| | | 353/98 |
| 8,317,332 B2 * | 11/2012 | Lin ...................... G02B 7/1825 |
| | | 353/31 |

(Continued)

FOREIGN PATENT DOCUMENTS

| EP | 1 536 267 A1 | 6/2005 |
| JP | H06-160942 | 6/1994 |

(Continued)

OTHER PUBLICATIONS

Extended European Search Report dated Apr. 19, 2021 in European Patent Application No. 20208378.8, 5 pages.

*Primary Examiner* — William C. Dowling
(74) *Attorney, Agent, or Firm* — Xsensus LLP (57) ABSTRACT

An optical-element angle adjustment device includes: a first protruding portion and a second protruding portion formed to protrude on the same axis from opposite positions across an optical mirror held by a mirror holding portion; a first adjustment member having an elongated hole formed along a direction corresponding to a first rotation direction representing a direction in which the axis is rotated, in which the second protruding portion is inserted; and a second adjustment member fitting with the second protruding portion protruding from the first adjustment member. A position of the second protruding portion in the elongated hole is adjusted using the first adjustment member. An angle of rotation of the second adjustment member in a second rotation direction with the axis as a rotation axis is adjusted. Thereafter positions of the first adjustment member and the second adjustment member are fixed.

5 Claims, 9 Drawing Sheets

(51) Int. Cl.
    *G02B 26/00*     (2006.01)
    *G03B 21/28*     (2006.01)
    *G03B 21/20*     (2006.01)

(52) U.S. Cl.
    CPC ....... *G03B 21/142* (2013.01); *G03B 21/2066* (2013.01); *G03B 21/28* (2013.01)

(58) Field of Classification Search
    USPC .......................................................... 353/98
    See application file for complete search history.

(56) References Cited

U.S. PATENT DOCUMENTS

| | | |
|---|---|---|
| 2005/0111787 A1 | 5/2005 | Miyajima et al. |
| 2007/0247597 A1* | 10/2007 | Lin ................. G03B 21/28 353/98 |
| 2008/0007702 A1* | 1/2008 | Kao ................. G03B 21/28 353/119 |
| 2014/0118706 A1 | 5/2014 | Fujioka et al. |
| 2014/0132938 A1 | 5/2014 | Tsuchiya et al. |
| 2016/0341957 A1 | 11/2016 | Kano |
| 2016/0377963 A1 | 12/2016 | Tsuchiya et al. |
| 2017/0031132 A1 | 2/2017 | Fujioka et al. |
| 2020/0159096 A1* | 5/2020 | Dubois ................. G03B 21/10 |

FOREIGN PATENT DOCUMENTS

| | | |
|---|---|---|
| JP | H09-128779 | 5/1997 |
| JP | 3103856 | 9/2000 |
| JP | 2002-090876 | 3/2002 |
| JP | 4096505 | 3/2008 |
| JP | 2011-164479 | 8/2011 |

* cited by examiner

OPTICAL-ELEMENT ANGLE ADJUSTMENT DEVICE AND IMAGE PROJECTION DEVICE

CROSS-REFERENCE TO RELATED APPLICATIONS

The present application claims priority under 35 U.S.C. § 119 to Japanese Patent Application No. 2019-211815, filed on Nov. 22, 2019 and Japanese Patent Application No. 2020-129245, filed on Jul. 30, 2020. The contents of which are incorporated herein by reference in their entirety.

BACKGROUND OF THE INVENTION

1. Field of the Invention

The present invention relates to an optical-element angle adjustment device and an image projection device.

2. Description of the Related Art

In this day and age, projectors are known that emit desired images onto a screen. As far as the accuracy of the fixing positions of the optical elements in a projector is concerned, it is often demanded to have a higher accuracy than the dimensional accuracy of the component parts.

As a method of fixing the optical elements, there is a known method in which the optical elements are held using jigs and tools, and are fixed by adhesion at specified positions. Alternatively, there is a known method in which a shim is inserted for each optical element so as to ensure that the optical elements are arranged at specified positions. Still alternatively, there is a known method in which adjustable screws are tightened or loosened to adjust the positions of the optical elements, and the fixing positions are adjusted. A "shim" has the shape of, for example, a wedge or a plate, and is inserted into the gap between two members for the purpose of adjusting the positions of those two members. A shim is sometimes also called a spacer.

In Japanese Unexamined Patent Application Publication No. 2002-90876, a projector is disclosed that enables performing accurate angle adjustment of the mirror. In this projector, the mirror is pressed from both sides using an elastic member and an adjustment member, and the angle of the mirror is adjusted by moving the adjustment member.

SUMMARY OF THE INVENTION

According to an aspect of the present invention, an optical-element angle adjustment device includes a mirror holding portion, a first protruding portion and a second protruding portion, a bearing, a first adjustment member, and a second adjustment member. The mirror holding portion holds an optical mirror. The first protruding portion and the second protruding portion are formed to protrude on the same axis with respect to the mirror holding portion from opposite positions across the optical mirror. The bearing supports the first protruding portion. The first adjustment member has an elongated hole formed along a direction corresponding to a first rotation direction representing a direction in which the axis of the first protruding portion is rotated, the second protruding portion being inserted in the elongated hole. The second adjustment member fits with the second protruding portion protruding from the first adjustment member, and is configured to rotate the mirror holding portion via the second protruding portion in a second rotation direction with the axis as a rotation axis. A position of the second protruding portion in the elongated hole is adjusted using the first adjustment member so that an angle of rotation of the mirror holding portion in the first rotation direction is adjusted. The angle of rotation of the second adjustment member in the second rotation direction is adjusted so that the mirror holding portion is rotated via the second protruding portion. After rotation positions of the mirror holding portion are adjusted, positions of the first adjustment member and the second adjustment member are fixed using a fixing member.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an optical-element angle adjustment device and an image projection device that enable performing angle adjustment of optical elements with ease and accuracy.

Exemplary embodiments of an optical-element angle adjustment device and an image projection device are described below with reference to the accompanying drawings.

First Embodiment

Configuration of Projector

Figure 1:
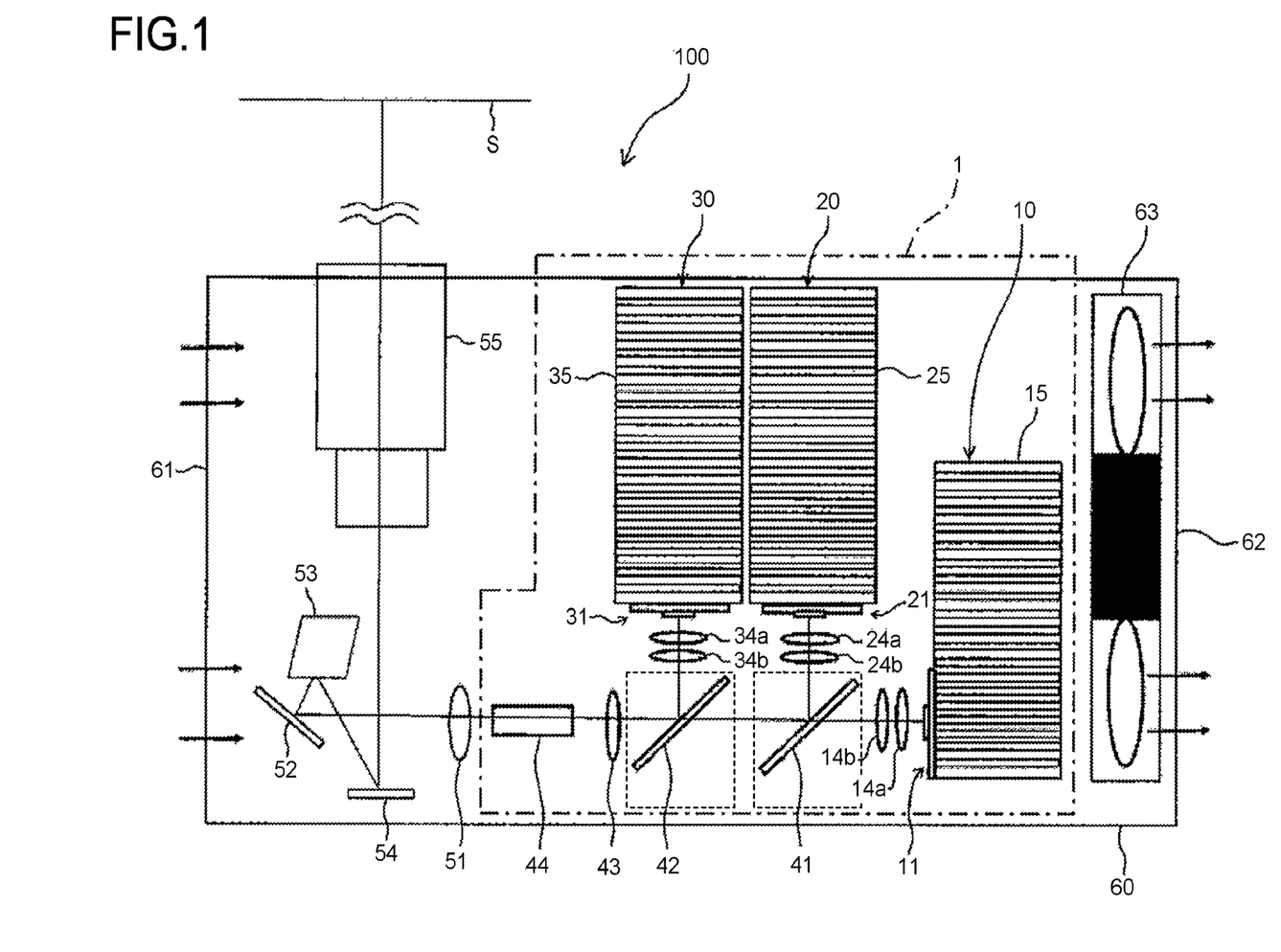
FIG. 1 is a perspective diagram of the relevant part in the housing of a projector according to a first embodiment.

FIG. 1 is a perspective diagram of the relevant part in the housing of a projector 100 according to a first embodiment. As illustrated in FIG. 1, a housing 60 of the projector 100 according to the first embodiment has the left lateral face serving as an air inlet port 61 and has the right lateral face serving as an air outlet port 62. In between the air inlet port 61 and the air outlet port 62, a cooling air passage is formed for enabling the flow of air sent from a cooling fan 63 installed at the air outlet port 62.

In the housing 60, a fourth collecting lens 51 that collects the light beams emitted from the light source device 1; and a first reflective mirror 52 and a second reflective mirror 53 that reflect the collected light beams toward an image forming panel 54 are installed. Moreover, in the housing 60, the image forming panel 54; and a projection lens 55 that projects, onto a screen S, the light of the images reflected from the image forming panel 54 are installed.

The light source device 1 includes a red (R) light source unit 20, a green (G) light source unit 30, and a blue (B) light source unit 10. The light source units 10 to 30 have a substrate with a red light source element 21, a green light source element 31, and a blue light source element 11, respectively, installed thereon. Moreover, the light source device 1 includes a first collecting lens 24a and a second collecting lens 24b that convert the red light emitted from the red light source element 21 into a parallel flux; and includes a heat sink 25 that releases the heat generated in the red light source element 21. In an identical manner, the light source device 1 includes a first collecting lens 34a and a second collecting lens 34b that convert the green light emitted from the green light source element 31 into a parallel flux; and includes a heat sink 35 that releases the heat generated in the green light source element 31. In an identical manner, the light source device 1 includes a first collecting lens 14a and a second collecting lens 14b that convert the blue light emitted from the blue light source element 11 into a parallel flux; and includes a heat sink 15 that releases the heat generated in the blue light source element 11.

A first dichroic mirror 41 has the property of transmitting the light having the wavelength region of the blue color and reflecting the light having the wavelength region of the red color. A second dichroic mirror 42 has the property of transmitting the light having the wavelength region of the blue color and the red color, and reflecting the light having the wavelength region of the green color.

Hence, the light emitted from the red light source element 21 is converted into a parallel flux by the first collecting lens 24a and the second collecting lens 24b; and the parallel flux gets reflected from the first dichroic mirror 41 and is guided toward a third collecting lens 43 via the second dichroic mirror 42. In an identical manner, the light emitted from the green light source element 31 is converted into a parallel flux by the first collecting lens 34a and the second collecting lens 34b; and the parallel flux gets reflected from the second dichroic mirror 42 and is guided toward the third collecting lens 43. Moreover, the light emitted from the blue light source element 11 is converted into a parallel flux by the first collecting lens 14a and the second collecting lens 14b; and the parallel flux is guided toward the third collecting lens 43 via the first dichroic mirror 41 and the second dichroic mirror 42.

The third collecting lens 43 shapes the parallel flux of each color as a micro spot. Then, the light of each color, which is shaped as a micro spot by the third collecting lens 43, is guided to a light tunnel 44. The light tunnel 44 causes multiple reflection of the guided light of each color, so that overlap-adding and homogenization of the light of each color is achieved. After passing through the light tunnel 44, the light gets converted into a parallel flux due to a fourth collecting lens 51. Then, the parallel flux gets reflected from a first reflective mirror 52 and a second reflective mirror 53; and the reflected light is delivered to the image forming panel 54.

The image forming panel 54 is driven based on the image data supplied from an external input device such as a personal computer. The light of each color delivered to the image forming panel 54 gets reflected from the image forming panel 54, thereby resulting in the formation of a projection light of a color image corresponding to the image data. The projection light is then projected in an enlarged form onto the screen S via the projection lens 55. As a result, a color image is displayed in an enlarged form on the screen S.

Configuration of Angle Adjustment Mechanism for Dichroic Mirrors

Given below is the explanation of an angle adjustment mechanism for the first dichroic mirror 41 and the second dichroic mirror 42 that are installed in the projector 100 according to the first embodiment. In the following explanation, the first dichroic mirror 41 and the second dichroic mirror 42 are referred to as "optical mirrors".

Figure 2:
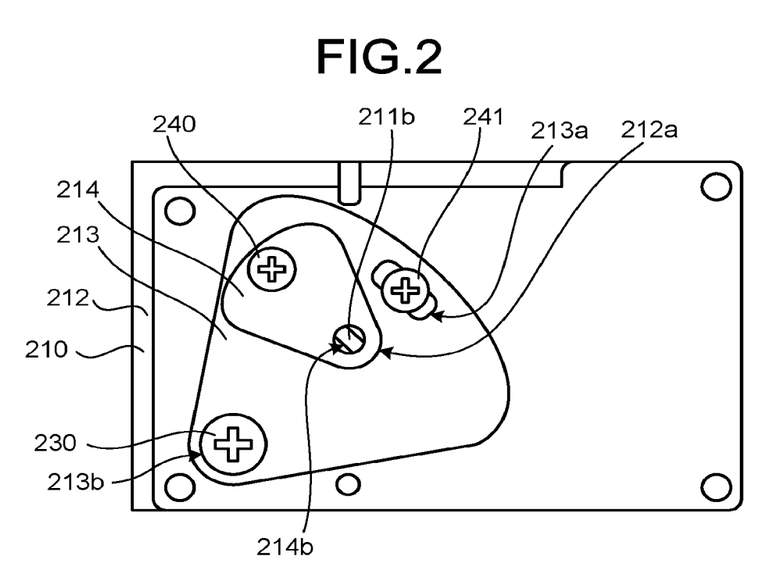
FIG. 2 is a top view of an angle adjustment mechanism installed in the projector according to the first embodiment.
Figure 3:
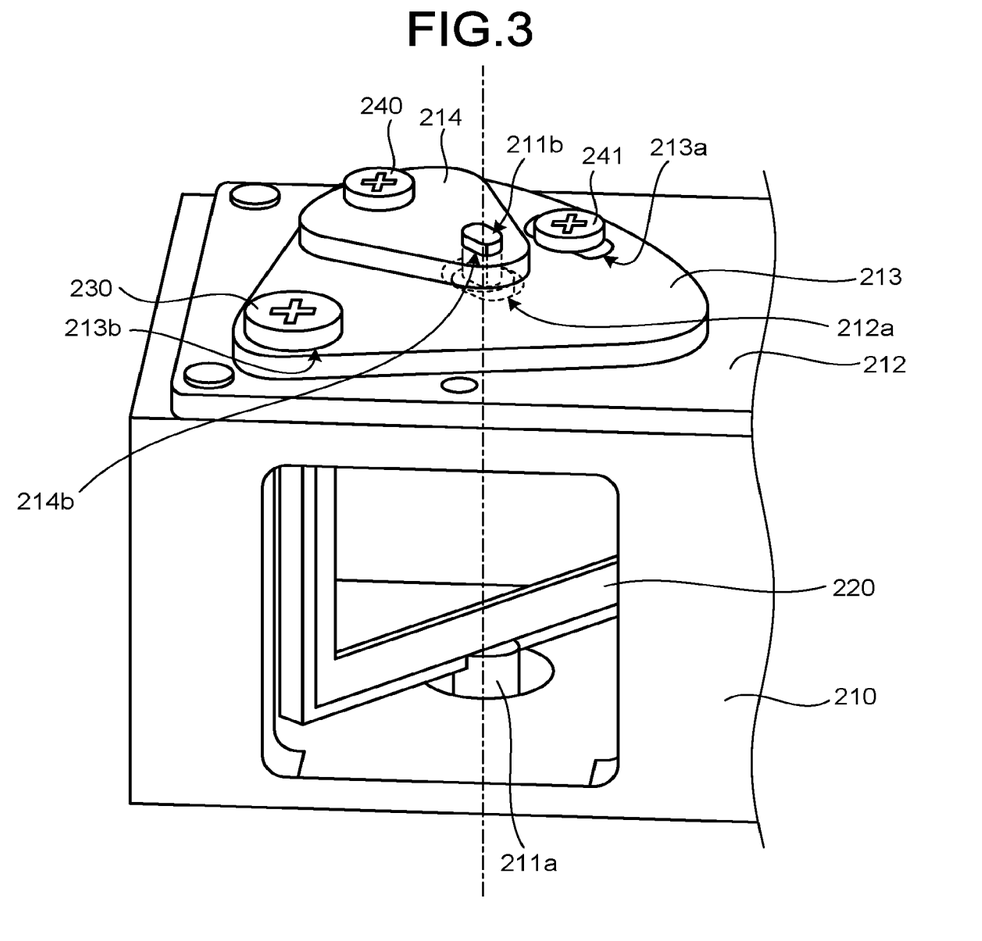
FIG. 3 is a top perspective view of the angle adjustment mechanism, when viewed from diagonally upward left, installed in the projector according to the first embodiment.
Figure 4A:
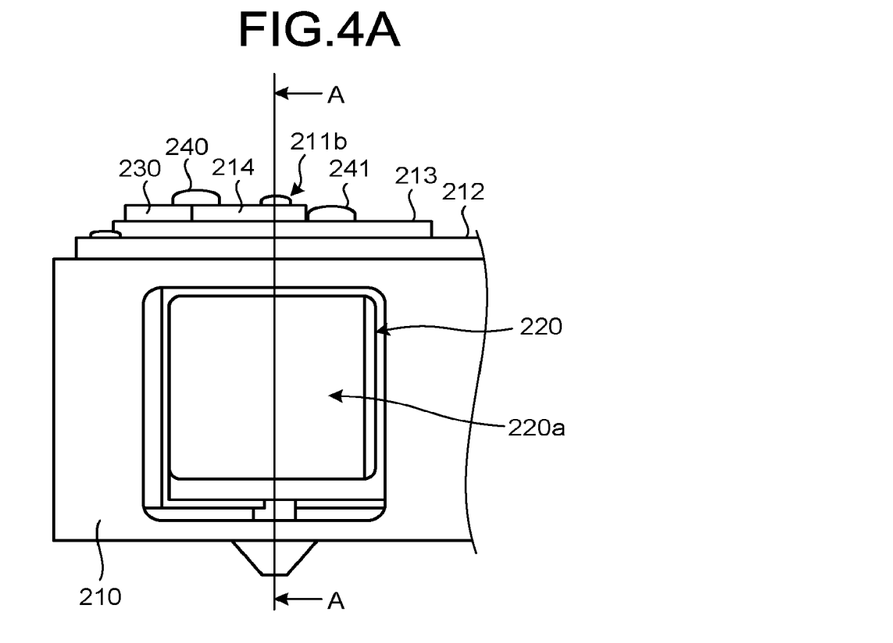
FIGS. 4A and 4B are diagrams for explaining the inside of the angle adjustment mechanism installed in the projector according to the first embodiment.
Figure 4B:
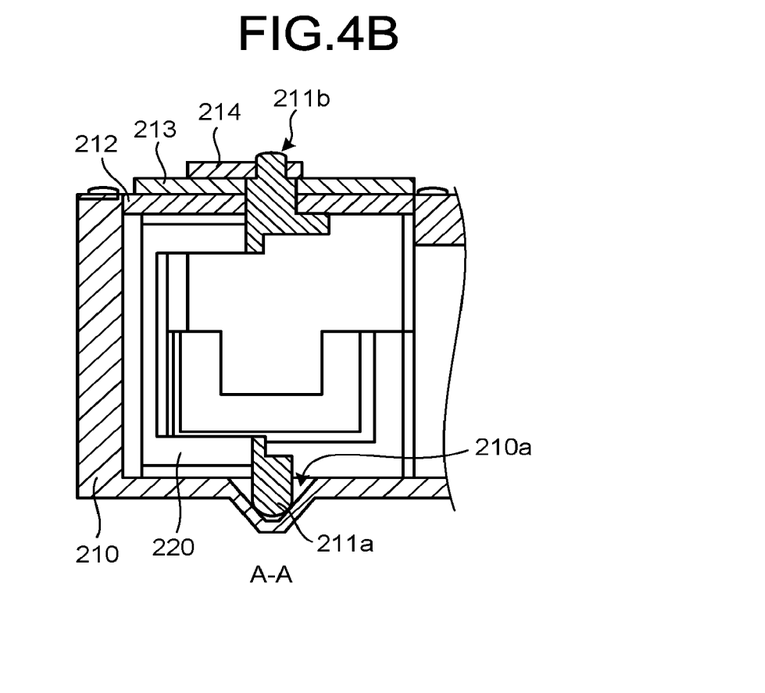

FIG. 2 is a top view of the angle adjustment mechanism, and FIG. 3 is a top perspective view of the angle adjustment mechanism when viewed from diagonally upward left. FIGS. 4A and 4B are diagrams for explaining the inside of the angle adjustment mechanism. In FIGS. 4A and 4B, FIG. 4A is a side view of the angle adjustment mechanism, and FIG. 4B is an A-A cross-sectional view of FIG. 4A.

As illustrated in FIGS. 2 to 4, the angle adjustment mechanism includes a holder member 220 representing an example of a mirror holding portion for holding an optical mirror; and includes a box-like housing 210 for housing the holder member 220. Moreover, the angle adjustment mechanism includes a sealing lid 212 that serves as a lid for sealing the housing 210 in which the holder member 220 is housed; and includes a first adjustment member 213 and a second adjustment member 214 that are used in performing angle adjustment of the holder member 220.

The holder member 220 includes a first protruding portion 211a that has, for example, a rectangular shape and that protrudes from the underside of the holder member 220; and includes a second protruding portion 211b that protrudes from the top side of the holder member 220. The first protruding portion 211a and the second protruding portion 211b are arranged in a coaxial manner along the middle of the rectangular holder member 220.

As illustrated in FIGS. 4A and 4B, the first protruding portion 211a gets inserted into a conical concave portion 210a that represents an example of a bearing formed on the underside of the housing 210 of the angle adjustment mechanism. Of the first protruding portion 211a that gets inserted into the concave portion 210a, the leading end (the portion abutting against the concave portion 210a) is processed to have, for example, a hemisphere shape. As a result, in the range within which the first protruding portion 211a is movable inside the conical concave portion 210a, tilting and rotation of the holder member 220 becomes possible without having to move the center point of the holder member 220.

Meanwhile, the leading end of the first protruding portion 211a can also have some other shape other than the hemisphere shape. However, if the leading end either has the shape of a part of a spherical surface, such as the hemisphere shape, or is a spherical body; then the holder member 220 can be moved in a smooth manner.

Figure 5:
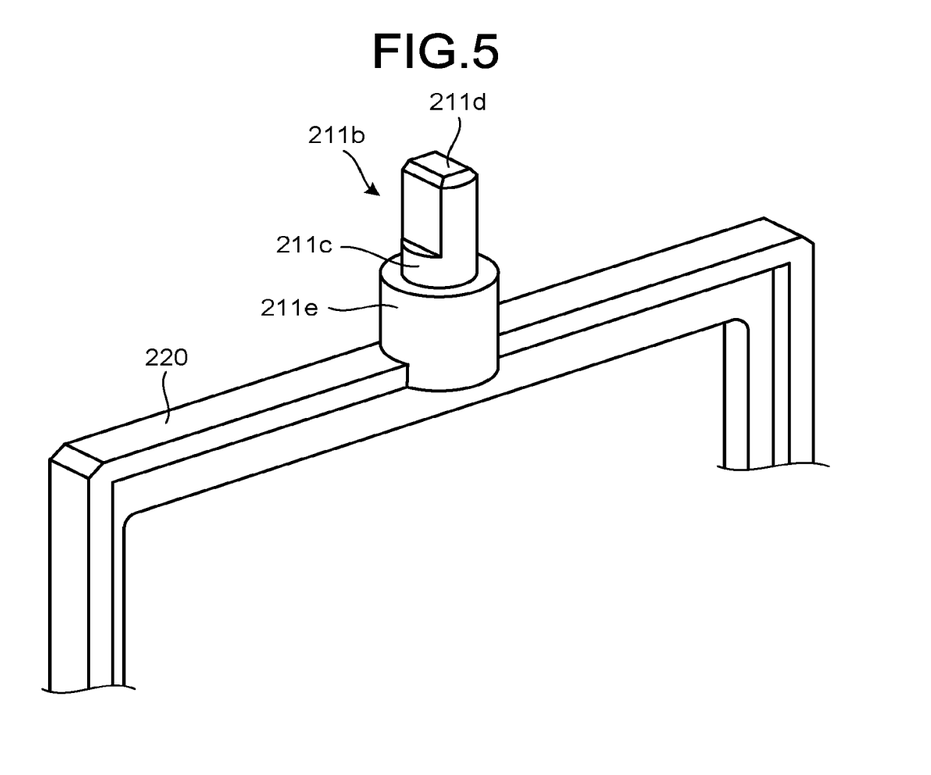
FIG. 5 is an enlarged perspective view of a second protruding portion a of a holder member installed in the projector according to the first embodiment.

FIG. 5 is an enlarged perspective view of the second protruding portion 211b of the holder member 220. As illustrated in FIG. 5, the second protruding portion 211b includes a cylindrical protruding portion 211e that protrudes from the top side of the holder member 220; and includes a protruding portion 211d that is coaxial with the cylindrical protruding portion 211e and that protrudes from the cylindrical protruding portion 211e. Thus, the second protruding portion 211b has a multistage shape made of the cylindrical protruding portion 211e and the protruding portion 211d, which protrudes from the cylindrical protruding portion 211e.

The protruding portion 211d has a milling face formed by cutting off some portion of a cylindrical periphery 211c, which has a smaller diameter than the cylindrical protruding portion 211e, along the optical axis direction. Moreover, the protruding portion 211d has another milling face that is formed parallel to the abovementioned milling face and that is formed by cutting off some portion of the periphery 211c. As a result of performing the cutting process for forming a pair of milling faces, the protruding portion 211d has a substantially cuboid shape.

In this example, although the protruding portion 211d has a substantially cuboid shape, it can have any other shape as long as it fits, without rotating, in a fitting hole 214b of the second adjustment member 214 (described later). For example, the protruding portion 211d can have a triangular prism shape or a polygon shape having five or more angles. However, it is desirable that the shape of the protruding portion 211d is such that, at the time of fitting in the fitting hole 214b, the protruding portion 211d does not rotate in the second adjustment member 214.

Figure 6:
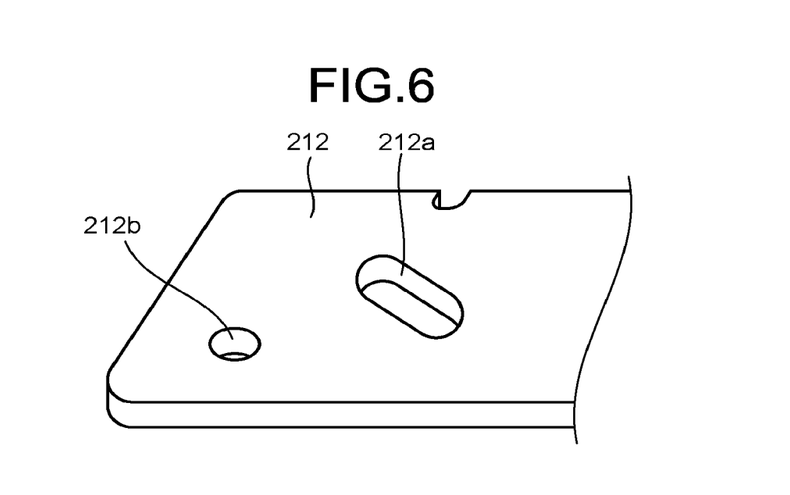
FIG. 6 is a perspective view of a sealing lid for the housing of the angle adjustment mechanism installed in the projector according to the first embodiment.

FIG. 6 is a perspective view of a part of the sealing lid 212 for the housing 210 of the angle adjustment mechanism. The sealing lid 212 has an oblong plate-like shape. As illustrated in FIG. 2, the sealing lid 212 is fastened on the top face of the housing 210, which has the holder member 220 installed therein, as the lid for the housing 210. On the sealing lid 212, an elongated hole 212a is formed in which, when the sealing lid 212 is fastened to the housing 210, the second protruding portion 211b of the holder member 220 gets inserted. The elongated hole 212a has such a shape and size that the second protrusion portion 211b inserted therein is movable along the longitudinal direction without any shaking.

Moreover, in the sealing lid 212, a screw hole 212b is formed for use with the first adjustment member 213. Although described later in detail, after the adjustment of the optical mirrors is finished, the first adjustment member 213 is fastened and fixed to the sealing lid 212 using a screw 230 via the screw hole 212b as illustrated in FIG. 2.

Figure 7:
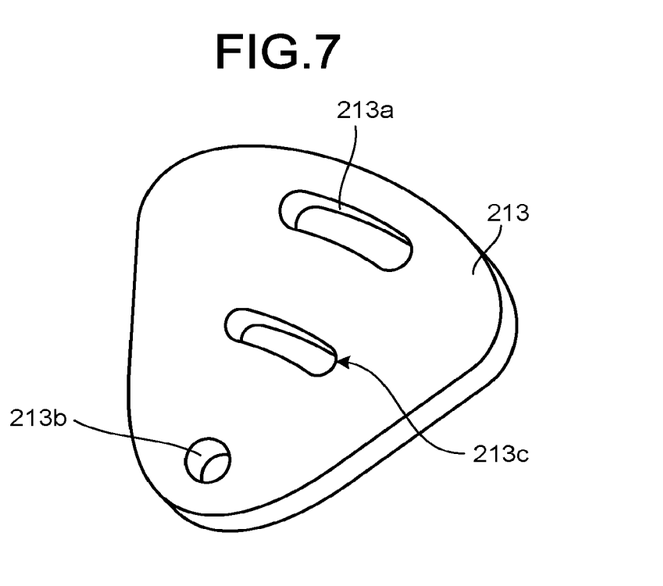
FIG. 7 is a perspective view of a first adjustment member of the angle adjustment mechanism.

FIG. 7 is a perspective view of the first adjustment member 213. As illustrated in FIG. 7, the first adjustment member 213 is a plate having the shape of a substantially equilateral triangle. In the substantially middle portion of the first adjustment member 213, a fitting hole 213c having a substantially oblong shape is formed in such a way that the protruding portion 211d of the holder member 220 fits therein. Moreover, in the first adjustment member 213, a pair of holes 213a and 213b for fastening is formed across the fitting hole 213c.

Of those holes for fastening, the hole 213a for fastening has the substantially same shape and size as the elongated hole 212a formed on the sealing lid 212. Since the hole 213a for fastening is an elongated hole, at the position corresponding to the movement of the holder member 220, the first adjustment member 213 can be fastened to the sealing lid 212 using a screw 241 as illustrated in FIG. 2. On the other hand, the other hole 213b for fastening is a screw hole having the shape of an exact circle, and enables fastening of the first adjustment member 213 to the sealing lid 212 using the screw 230 illustrated in FIG. 2.

Figure 8:
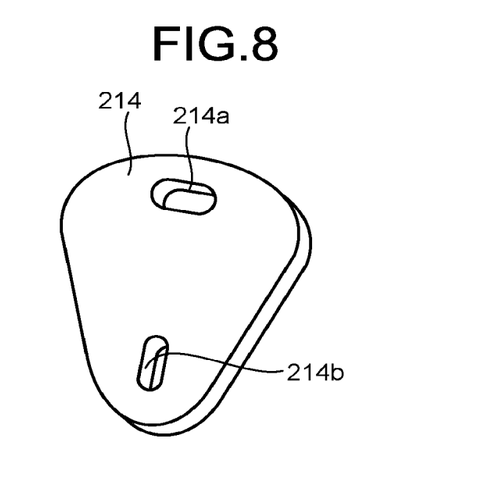
FIG. 8 is a perspective view of a second adjustment member of the angle adjustment mechanism.

FIG. 8 is a perspective view of the second adjustment member 214. As illustrated in FIG. 7, the second adjustment member 214 includes an elongated hole 214a for enabling fastening of the second adjustment member 214 to the first adjustment member 213, and includes the fitting hole 214b in which the protruding portion 211d of the holder member 220 fits.

The elongated hole 214a is formed in such a way that, at the time of fastening the second adjustment member 214 to the first adjustment member 213, the elongated hole 214a has the longitudinal direction to be orthogonal to longitudinal direction of the hole 213a for fastening as formed on the first adjustment member 213. The fitting hole 214b has a substantially elongated shape in which the protruding portion 211d of the holder member 220 fits without any gaps therebetween.

Operation for Adjusting Dichroic Mirrors Using Angle Adjustment Mechanism

Figure 9A:
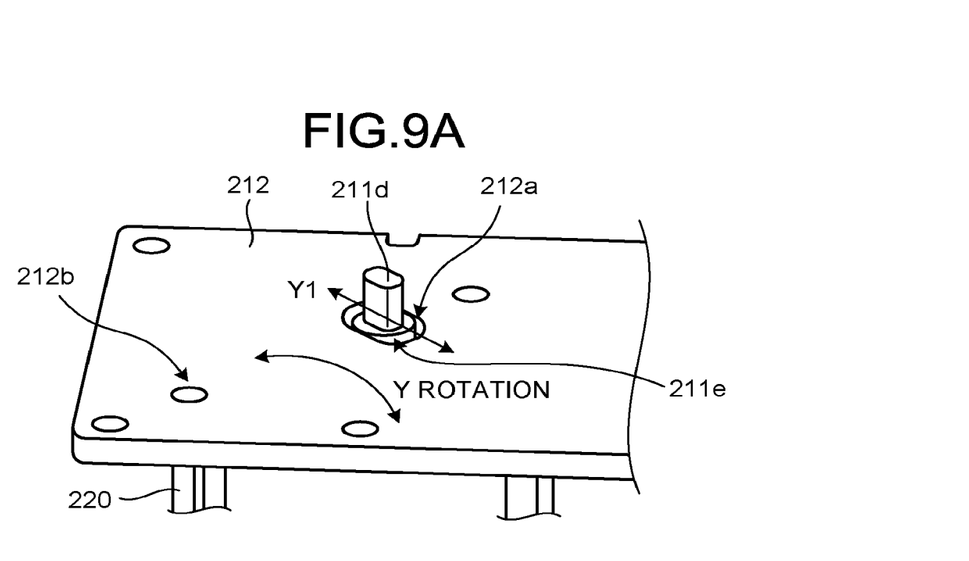
FIGS. 9A and 9B are perspective views for explaining the functions of the first adjustment member of the angle adjustment mechanism.

In the angle adjustment mechanism, as illustrated in FIG. 9A, the cylindrical protruding portion 211e of the second protruding portion 211b gets inserted in the elongated hole 212a formed in the sealing lid 212. The elongated hole 212a has an elongated hole shape that enables rotation of the holder member 220 in a Y rotation direction illustrated in FIG. 4A. As a result, with the center of the first protruding portion 211a, which is inserted in the conical concave portion 210a, serving as the fulcrum point; the holder member 220 becomes able to move in a Y1 direction illustrated in FIG. 9A. Thus, as a result of rotating the holder member 220 in the Y rotation direction along the elongated hole 212a, an optical mirror face 220a can be tilted in an obliquely upward direction or an obliquely downward direction.

Figure 9B:
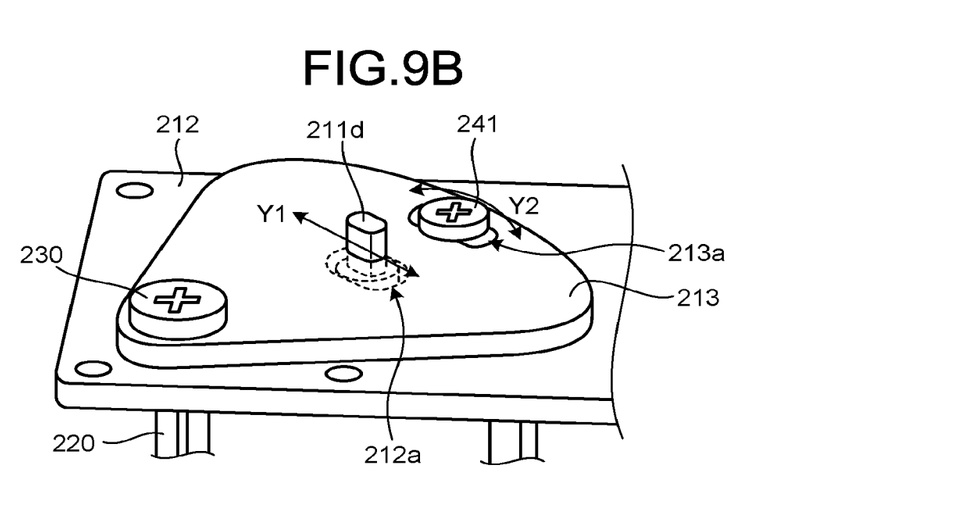

In the case of adjusting and fixing the Y rotation position of the holder member 220, the protruding portion 211d of the holder member 220 that protrudes from the elongated hole 212a of the sealing lid 212 is fit in the fitting hole 213c of the first adjustment member 213 as illustrated in FIG. 9B. Then, the first adjustment member 213 is tentatively fixed to the sealing lid 212 using the screws 230 and 241. In that state, with the screw 230 serving as the fulcrum point, the first adjustment member 213 becomes able to move along the longitudinal direction of the elongated hole 213a for fastening, that is, along a Y2 direction illustrated in FIG. 9B.

Since the protruding portion 211d of the holder member 220 fits in the fitting hole 213c of the first adjustment member 213, when the first adjustment member 213 is moved in the Y2 direction with the screw 230 serving as the fulcrum point, the optical mirror face of the holder member 220 tilts in the obliquely upward direction or the obliquely downward direction (Y rotation: an example of rotation with respect to a first rotation direction). In this way, after the angle of inclination of the optical mirror face is adjusted, the screws 230 and 241 are firmly tightened. As a result, the angle of inclination of the optical mirror face gets fixed to the adjusted angle of inclination.

Figure 10A:
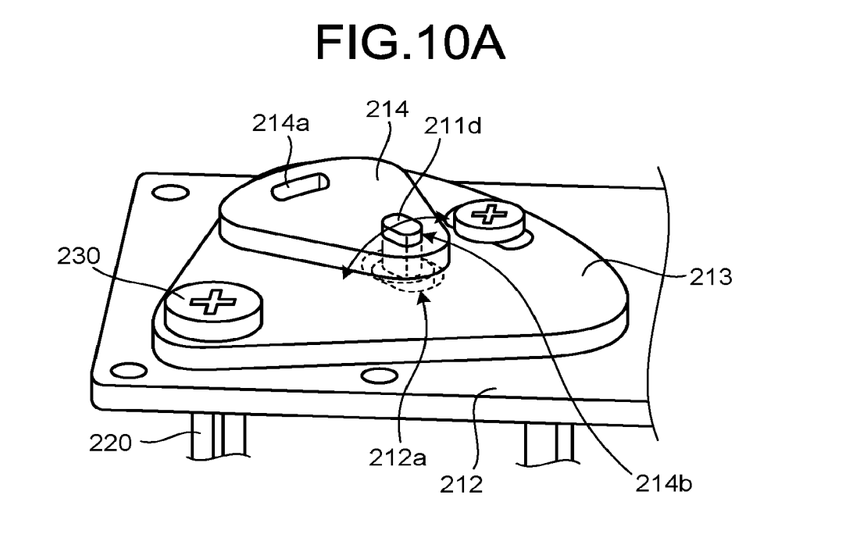
FIGS. 10A and 10B are perspective views for explaining the functions of the second adjustment member of the angle adjustment mechanism.
Figure 10B:
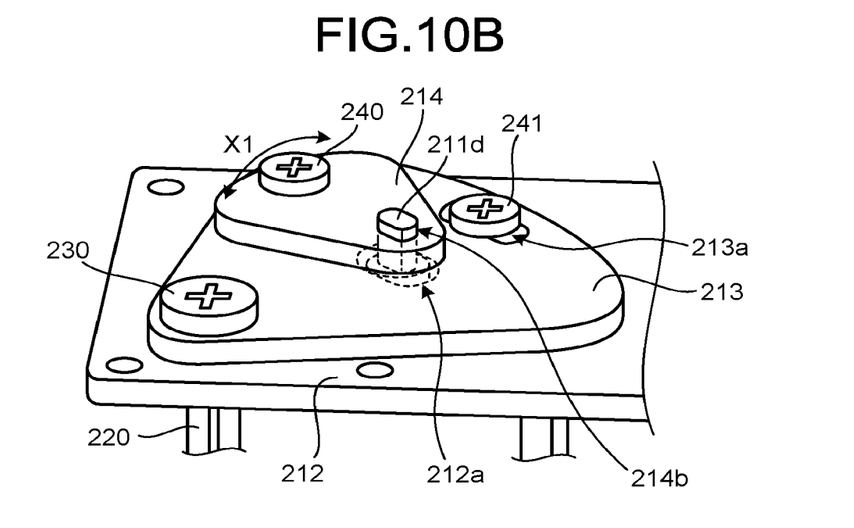

Subsequently, with the aim of performing the adjustment and fixing in an X rotation direction that is orthogonal in a plane with respect to the Y axis direction; as illustrated in FIG. 10A, the protruding portion 211d of the holder member 220 that protrudes from the first adjustment member 213 is fit in the fitting hole 214b of the second adjustment member 214. Then, as illustrated in FIG. 10B, the second adjustment member 214 is tentatively fixed to the first adjustment member 213 using a screw 240. In that state, with the fitting hole 214b serving as the fulcrum point, the second adjustment member 214 becomes able to move along the longitudinal direction of the elongated hole 214a for fastening, that is, along an X1 direction illustrated in FIG. 10B.

In the fitting hole 214b of the second adjustment member 214, the protruding portion 211d of the holder member 220 fits. Hence, when the second adjustment member 214 is moved in the X1 direction illustrated in FIG. 10B; as illustrated in FIG. 10A, the optical mirror face rotates in the left-right direction (X rotation: an example of rotation with respect to a second rotation direction) via the protruding portion 211d of the holder member 220 serving as the fulcrum point.

In this way, after the angles of rotation of the optical mirror face on the right and left sides are adjusted, the screw 240 is firmly tightened. As a result, the second adjustment member 214 gets fixed to the first adjustment member 213, and the rotation positions of the optical mirror face in the right and left sides get fixed at the adjusted rotation positions in the right and left sides.

The protruding portion 211 of the holder member 220 has the shape of, for example, a quadratic prism that fits, without any rotation, in the fitting hole 214b of the second adjustment member 214. For that reason, the operation for adjusting the rotation positions of the optical mirror face in the right and left sides can be performed with excellent operability and responsiveness.

Moreover, since the second protruding portion 211b has a multistage shape made of the cylindrical protruding portion 211e and the protruding portion 211d, which protrudes from the cylindrical protruding portion 211e; the angle of inclination as well as the rotation position of the holder member 220 can be adjusted on an individual basis, thereby making it simpler to perform the adjustment task. Moreover, it becomes possible to perform the adjustment with high accuracy.

Effects of First Embodiment

As is clear from the explanation given above, the angle adjustment mechanism of the projector 100 according to the first embodiment includes the first adjustment member 213 meant for adjusting the angle of inclination (the angle in the Y1 direction) of the holder member 220 that is used to hold the optical mirrors such as the dichroic mirrors 41 and 42. Moreover, the angle adjustment mechanism includes the second adjustment member 214 meant for adjusting the rotation positions of the holder member 220 in the right and left sides (the rotation positions in the X1 direction). Using the adjustment members 213 and 214, the angle of inclination and the right-left rotation positions of the optical mirror face are adjusted via the holder member 220, and then the adjustment members 213 and 214 are fastened.

As a result, just by rotating the adjustment members 213 and 214, the angle of inclination and the right-left positions of the optical mirror face can be adjusted with accuracy and simplicity while keeping a watch. Moreover, after the adjustment is finished, just by fastening the adjustment members 213 and 214, the angle of inclination and the right-left positions of the optical mirror face can be held in a simple and reliable manner.

Furthermore, the protruding portion 211 of the holder member 220 has the shape of, for example, a quadratic prism that fits, without any rotation, in the fitting hole 214b of the second adjustment member 214. For that reason, the operation for adjusting the rotation positions of the optical mirror face in the right and left sides can be performed with excellent operability and responsiveness.

Second Embodiment

Given below is the explanation of a projector according to a second embodiment. In the case of the projector 100 according to the first embodiment, the angle adjustment mechanism is used to adjust the angle of inclination and the right-left positions of the first dichroic mirror 41 and the second dichroic mirror 42.

Alternatively, the angle adjustment mechanism can be used for adjusting the angle of inclination and the right-left positions of other optical mirrors other than the dichroic mirrors. As an example, in FIG. 11 is illustrated an example in which an angle adjustment mechanism is used for adjusting the angle of inclination and the right-left positions of a wavelength-selection polarization-separation element (half mirror) 113.

Figure 11:
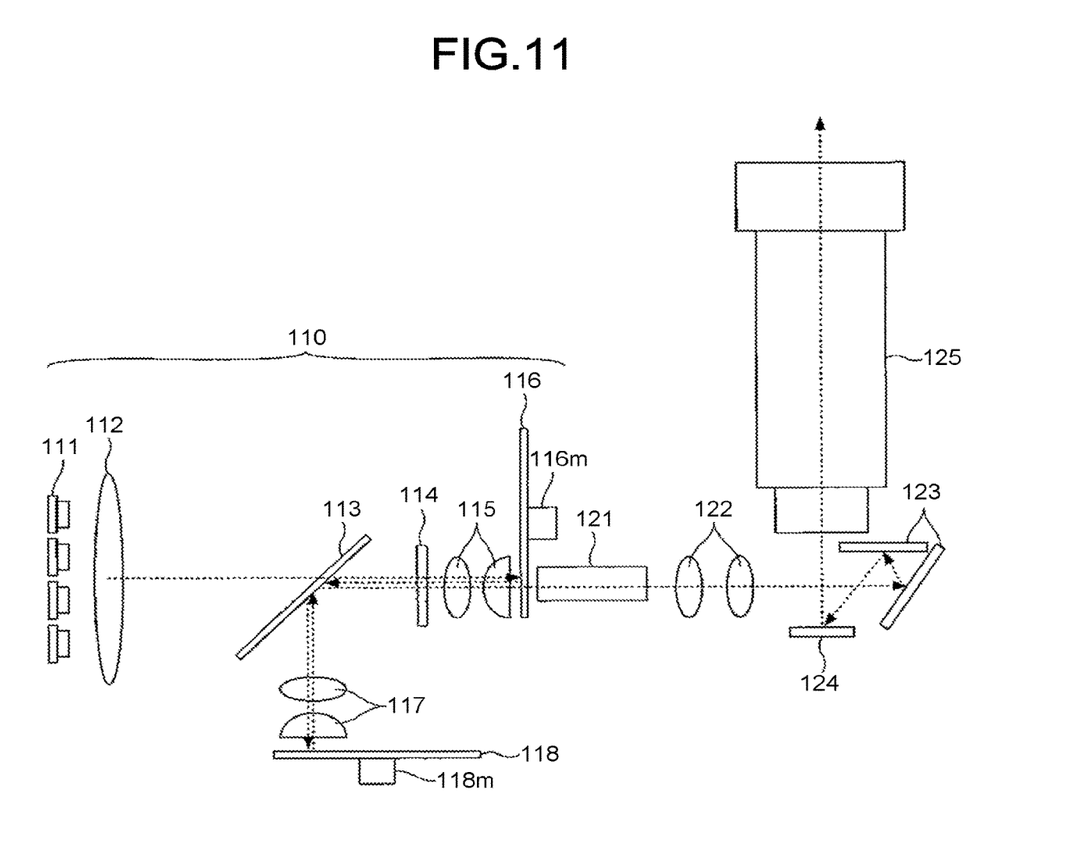
FIG. 11 is a perspective diagram of the relevant part in the housing of a projector according to a second embodiment.

The projector illustrated in FIG. 11 includes an illumination device 110, a light tunnel 121, a lens group 122, a mirror group 123, an image forming element 124, and a projection optical unit 125.

The illumination device 110 includes a light source 111, a collecting lens 112, the wavelength-selection polarization-separation element (half mirror) 113, a quarter-wave plate 114, a lens group 115, a color wheel 116, a lens group 117, and a phosphor wheel 118. The illumination device 110 emits a blue light, a red light, and a green light in the same direction (in the same emitted-light path) in a sequential and time-sharing manner toward the light tunnel 121.

In the illumination device 110, the light source 111 emits a first light having a first linear polarization component. As an example, as the light source 111, it is possible to use a laser diode that emits a blue laser light having a wavelength λB and including the P polarization component (i.e., representing the P waves).

Alternatively, as the light source 111, it is possible to use a light emitting diode or an organic electroluminescence (EL) element that emits a blue light, or it is possible to use a light source configured by combining such light sources. Still alternatively, it is possible to use a laser diode, a light emitting diode, or an organic EL element that emits a light having the wavelength region of the ultraviolet part; or it is possible use a light sources configured by combining such light sources.

The blue laser light emitted from the light source 111 passes through the collecting lens 112 and falls onto the wavelength-selection polarization-separation element 113 as a substantially parallel flux. Regarding the wavelength-selection polarization-separation element 113, the angle of inclination and the right-left rotation positions are adjusted using the angle adjustment mechanism explained in the first embodiment. From among the P waves and the S waves of the wavelength λB of the light source 111, the wavelength-selection polarization-separation element 113 transmits the P waves and reflects the S waves.

Thus, the blue laser light of the P waves that falls on the wavelength-selection polarization-separation element 13 passes through the wavelength-selection polarization-separation element 113 and is guided toward the quarter-wave plate 114 that is used to convert a linearly polarized light into a circularly polarized light and to convert a circularly polarized light into a linearly polarized light. The quarter-wave plate 114 converts the blue laser light of the P waves into a circularly polarized blue laser light, and delivers it toward the color wheel 116 via the lens group 115.

The color wheel 116 is configured by dividing a discoid member into a plurality of fan-shaped segments. More particularly, the color wheel 116 is divided into three fan-shaped segments, namely, a red (R) segment, a green (G) segment, and a transmission segment that is transparent.

At the shaft center of the color wheel 116, a driving unit 116m such as a stepping motor is installed for rotating the color wheel 116. When the color wheel 116 rotates at predetermined timings as a result of the driving performed by the driving unit 116m; the incident position of the light coming from the lens group 115 changes among the red (R) segment, the green (G) segment, and the transmission segment.

That is, depending on the wavelength of the light collected by the lens group 115 and depending on the segment that is selectively placed at the incident position of the light coming from the lens group 115, it is decided whether the light falling on the color wheel 116 would pass through the color wheel 116 or would get reflected from the color wheel 116.

At the timing at which the transmission segment is placed at the incident position of the light coming from the lens group 115, the blue laser light falling on the color wheel 116 passes through the transmission segment and turns into a blue illumination light; and then the blue illumination light falls on the light tunnel 121. Since the blue illumination light that has passed through the color wheel 116 is a circularly polarized light, it becomes possible to reduce the speckle appearing on the screen.

On the other hand, at the timing at which the red (R) segment or the green (G) segment is placed at the incident position of the light coming from the lens group 115, the blue laser light falling on the color wheel 116 gets reflected from the color wheel 116. After getting reflected from the color wheel 116, the blue laser light falls on the quarter-wave plate 114 via the lens group 115. Subsequently, the incident light on the quarter-wave plate 14 is converted from the circularly polarized light into a light of the S waves; and then the light of the S waves falls on the wavelength-selection polarization-separation element 113. Meanwhile, the S polarization component represents the orthogonal component to the P polarization component.

The S-wave blue laser light, which has fallen on the wavelength-selection polarization-separation element 113, gets reflected from the wavelength-selection polarization-separation element 13 and falls on the phosphor wheel 118 via the lens group 117. That is, the wavelength-selection polarization-separation element 113 guides the S-wave light (S polarization light) to the phosphor wheel 118.

The lens group 117 is configured by appropriately combining, for example, biconvex lenses and plane-convex lenses; and has the function of focusing a substantially parallel flux as a spot on the phosphor wheel 18, and has the function of collecting the divergent light from the phosphor wheel 18 and converting it into a substantially parallel flux.

The phosphor wheel 118 is formed by placing a yellow phosphor on a circular plate-like member along the direction of rotation of the flat plate. The yellow phosphor uses the blue laser light as the excitation light, and forms a yellow fluorescence having a longer wavelength than the blue laser light. At the shaft center of the phosphor wheel 118, a driving unit 118m such as a stepping motor is installed for rotating the phosphor wheel 118.

In the phosphor wheel 118, a yellow phosphor 181 uses the incident blue laser light as the excitation light, and forms a yellow fluorescence having a longer wavelength than the blue laser light. Then, the yellow fluorescence falls on the wavelength-selection polarization-separation element 113 via the lens group 117. Since the yellow fluorescence has the wavelength of, for example, 500 nm or higher, it gets reflected from the wavelength-selection polarization-separation element 113 and falls on the color wheel 116 via the quarter-wave plate 114 and the lens group 15.

After falling on the color wheel 116, the yellow fluorescence gets converted into a red illumination light and a green illumination light due to the red (R) segment and the green (G) segment, respectively; and each illumination light falls in the light tunnel 121. Then, the illumination distribution of each illumination light gets homogenized in the light tunnel 121, and the homogenized light gets reflected from the mirror group 123 via the lens group 122 and is delivered to the image forming element 124.

The image forming element performs pixel-by-pixel gradation control of each illumination light and forms a color projection image. As the image forming element 124, it is possible to use, for example, a digital micromirror device (DMD). A DMD includes micromirrors in the units of pixels, and each micromirror can maintain the state corresponding to one of two different angles.

That is, each micromirror of a DMD can switch between an angle at which each illumination light is reflected toward the projection optical unit 125 (the ON state) and an angle at which each illumination light is reflected toward an internal absorber and is prevented from going to the outside (the OFF state). As a result, regarding each pixel to be displayed, the light to be projected can be controlled. Moreover, in a DMD, the time ratio of the ON state of each micromirror can be adjusted using the pulse width method (PWM method), and the gradation expression can be achieved for each pixel to be displayed.

Meanwhile, the image forming element 124 is not limited to be a DMD. That is, as long as a color projection image can be formed using each illumination light coming from the illumination device 10; for example, liquid crystals can be used as the image forming element 124.

The illumination light of each of red, green, and blue colors is delivered in a time-sharing manner to the image forming element 124 at the image generation timing; and, after gradation control for each display pixel is performed in the image forming element 24, the illumination light is projected on a screen via the projection optical unit 125. Then, due to the residual image phenomenon of the eyes, a color image is visually confirmed via the screen.

Effects of Second Embodiment

In the projector according to the second embodiment, the angle of inclination and the right-left positions of the wavelength-selection polarization-separation element (half mirror) 113 are adjusted using the angle adjustment mechanism. Hence, just by rotating the adjustment members 213 and 214, the angle of inclination and the right-left positions of the wavelength-selection polarization-separation element 113 can be adjusted with accuracy and simplicity while keeping a watch (i.e., the adjustment task can be simplified).

Lastly, while certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

For example, in a projector in which the light is dispersed using optical elements and in which a plurality of colored lights is used, the number of optical elements increases and hence the adjustment tasks also increase by necessity. However, in the present invention, the adjustment tasks regarding the optical elements can be simplified. That enables achieving reduction in the time required to perform adjustment of a number of optical elements as well as enables achieving a significant reduction in the workload.

Although the first adjustment member 213 and the second adjustment member 214 are fastened, they can alternatively be fixed using some other fixing method such as using an adhesive agent.

Meanwhile, the present invention is also applicable to various other devices such as a camera device, a printer device, a 3D printer device (a 3D modeling device), and a 3D scanner device that include optical elements such as mirrors.

That is, in the embodiments described above, although the present invention is applied in a projector that projects images onto a screen, the present invention is applicable also in various other devices, other than a projector, that include optical elements arranged in the light path. As an example, the present invention is applicable in an optical-shaping 3D printer device that includes, for example, a laser as the internal light source unit. Some optical-shaping 3D printer devices include an ultraviolet light source as the light source unit and include a DMD as the image forming unit. In such devices too, the present invention is applicable for the optical elements arranged in the light path.

A 3D scanner device includes, for example, a laser light device that emits light and a light receiving unit that receives the reflected light from the scanning target. In such a device too, the present invention is applicable for the optical elements arranged in the light path.

Moreover, also in a laser printer device that includes a light source unit to be used in writing, or in an imaging device such as a camera device; the present invention is applicable for the optical elements arranged in the light path.

Thus, the accompanying claims and their equivalents are intended to cover such forms or modifications as would fall within the scope and spirit of the inventions.

According to an embodiment, the angle adjustment of optical elements can be performed with simplicity and accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. An optical-element angle adjustment device comprising:
   a mirror holding portion holding an optical mirror;
   a first protruding portion and a second protruding portion formed to protrude on the same axis with respect to the mirror holding portion from opposite positions across the optical mirror;
   a bearing supporting the first protruding portion;
   a first adjustment member having an elongated hole formed along a direction corresponding to a first rotation direction representing a direction in which the axis of the first protruding portion is rotated, the second protruding portion being inserted in the elongated hole; and
   a second adjustment member fitting with the second protruding portion protruding from the first adjustment member, and configured to rotate the mirror holding portion via the second protruding portion in a second rotation direction with the axis as a rotation axis, wherein
   a position of the second protruding portion in the elongated hole is adjusted using the first adjustment member so that an angle of rotation of the mirror holding portion in the first rotation direction is adjusted,
   an angle of rotation of the second adjustment member in the second rotation direction is adjusted so that the mirror holding portion is rotated via the second protruding portion, and
   after rotation positions of the mirror holding portion are adjusted, positions of the first adjustment member and the second adjustment member are fixed using a fixing member.

2. The optical-element angle adjustment device according to claim 1, wherein
   the first protruding portion includes a portion making contact with the bearing and having a hemisphere shape, and
   the bearing has a conical shape.

3. The optical-element angle adjustment device according to claim 1, wherein the second protruding portion has a multistage shape including
   a cylindrical protruding portion inserted in the elongated hole of the first adjustment member, and
   a fitting protruding portion formed to protrude from the cylindrical protruding portion and fitting with the second adjustment member.

4. The optical-element angle adjustment device according to claim 3, wherein the fitting protruding portion has a prismatic shape.

5. An image projection device comprising:
   the optical-element angle adjustment device according to claim 1;
   a light source unit configured to emit light; and
   a color wheel including segments of a plurality of colors and configured to convert light coming from the light source unit into light corresponding to the plurality of colors of the segments, wherein an image is formed and projected using light having passed through each segment of the color wheel in synchronization with a rotation position of the color wheel.

* * * * *